United States Patent [19]

Joseph et al.

[11] 4,004,648
[45] Jan. 25, 1977

[54] MULTI-ENGINE, ARTICULATED VEHICLE APPARATUS

[75] Inventors: Craig L. Joseph, San Jose; Fred J. Caterina, Cupertino; Hans H. Cremer, San Jose, all of Calif.

[73] Assignee: FMC Corporation, San Jose, Calif.

[22] Filed: Mar. 27, 1975

[21] Appl. No.: 562,538

[52] U.S. Cl. .......................................... 180/14 R
[51] Int. Cl.² .......................................... B60K 5/08
[58] Field of Search .............. 180/105 R, 108, 14 R, 180/77 R, 14 A, 82 R; 303/3, 21 A, 21 EB, 7

[56] References Cited

UNITED STATES PATENTS

| | | | |
|---|---|---|---|
| 3,090,458 | 5/1963 | Wolf | 180/14 R |
| 3,130,805 | 4/1964 | Carter et al. | 180/14 R |
| 3,217,826 | 11/1965 | Carter et al. | 180/77 R |
| 3,263,767 | 8/1966 | Rockwell | 180/77 R |
| 3,512,277 | 5/1970 | Stuller | 180/77 R |
| 3,779,331 | 12/1973 | Burckhardt et al. | 303/21 EB |
| 3,802,528 | 4/1974 | Leiber | 303/21 EB |
| 3,819,004 | 6/1974 | Adde | 303/21 EB |
| 3,893,535 | 7/1975 | Burckhardt | 303/21 EB |
| 3,894,773 | 7/1975 | Cleveland et al. | 303/21 A |

Primary Examiner—Philip Goodman
Assistant Examiner—J. D. Rubenstein
Attorney, Agent, or Firm—R. S. Kelly; J. F. Schipper; C. E. Tripp

[57] ABSTRACT

An electronic governor for controlling the speed of one of two coupled prime movers wherein signals corresponding to wheel speeds of each of the two prime movers are compared to produce an error signal for controlling an actuator on one prime mover. The speed of the controlled prime mover may be abruptly reduced where the error signal exceeds a pre-determined threshold value. Monitoring means generally comprise digital circuitry, while control of the actuator is primarily analog acting through a servo loop containing a throttle position sensing device on the master prime mover, the error signal generating device and a throttle control device for the controlled prime mover.

9 Claims, 4 Drawing Figures

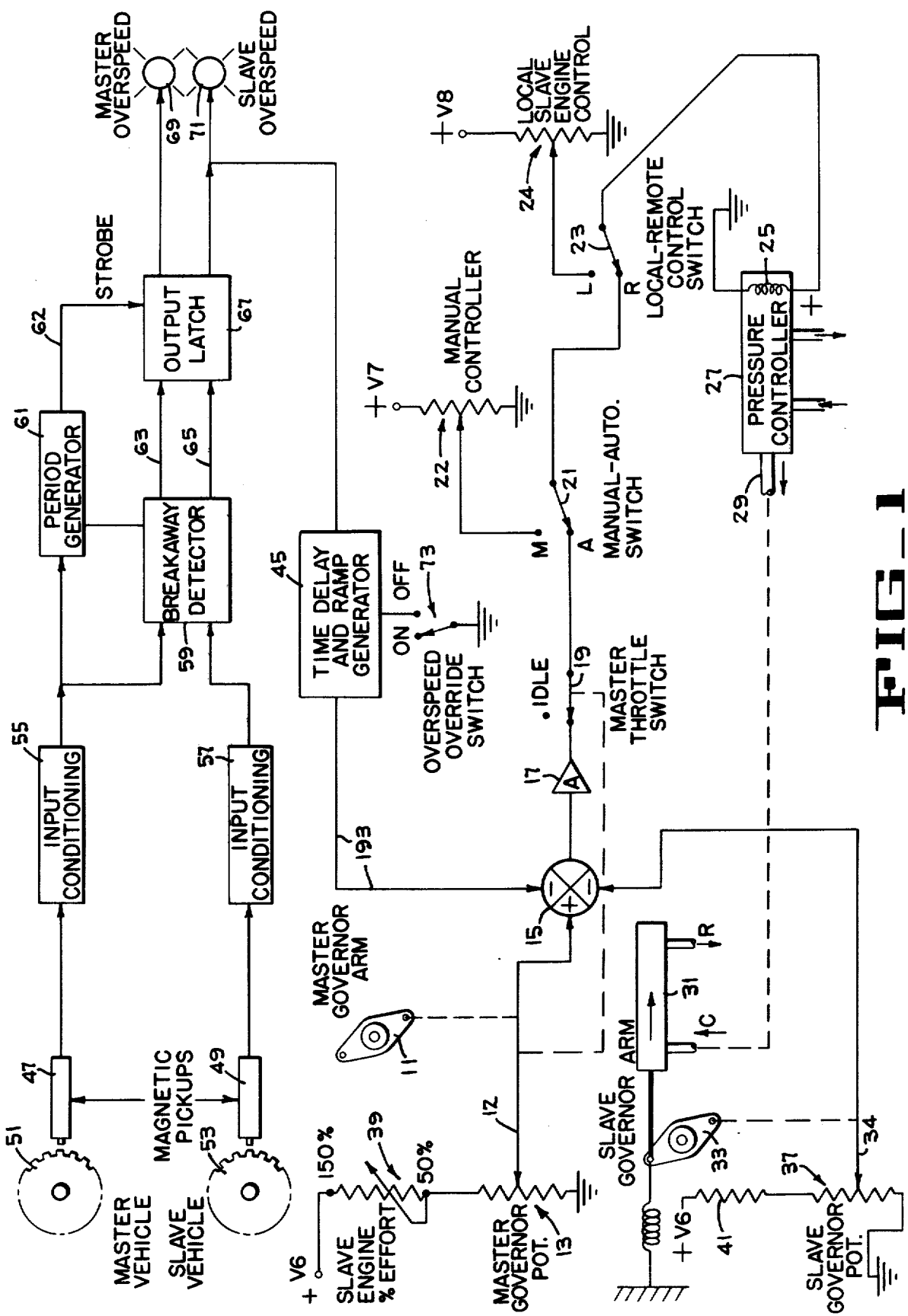
FIG_1

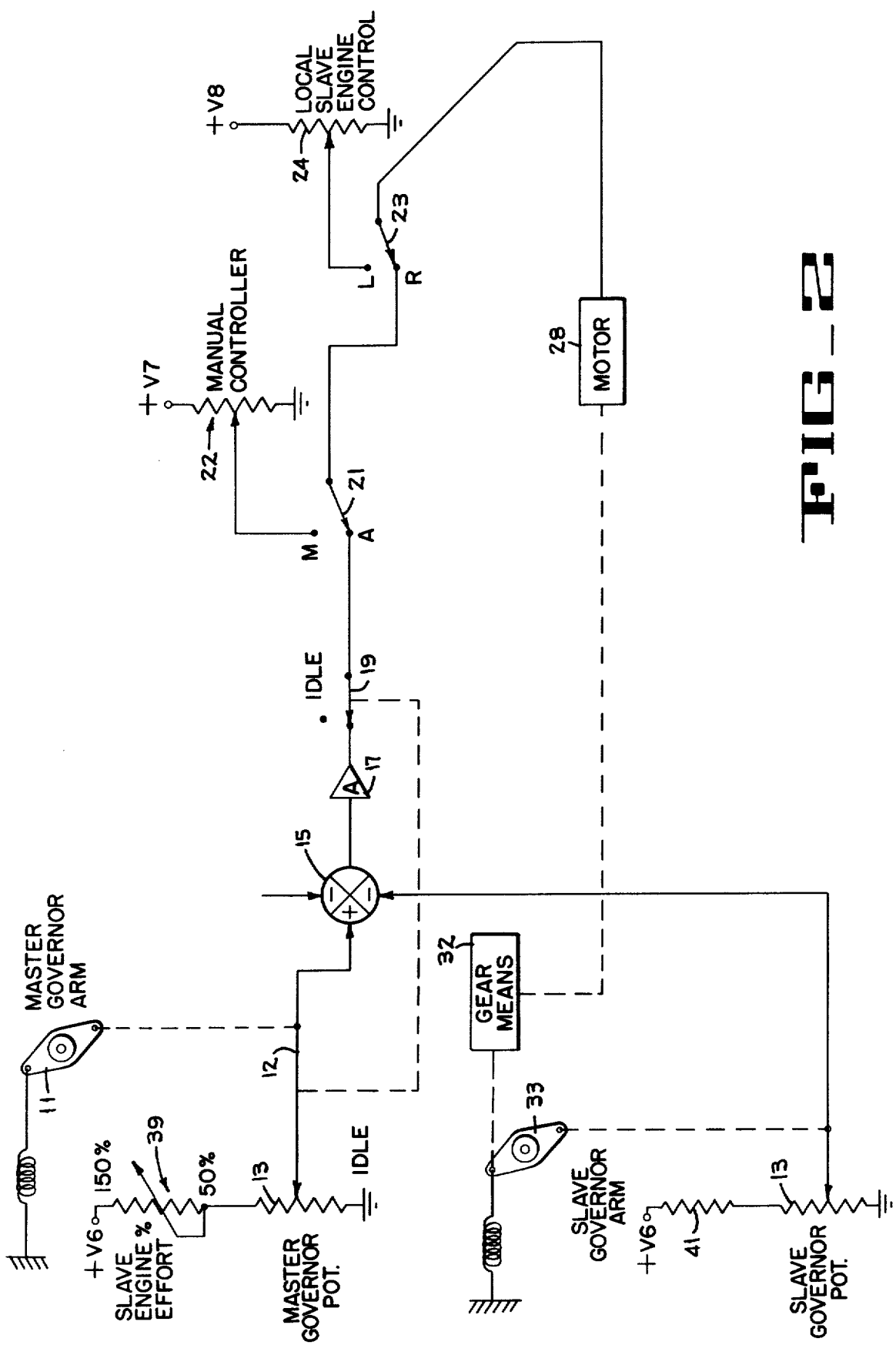

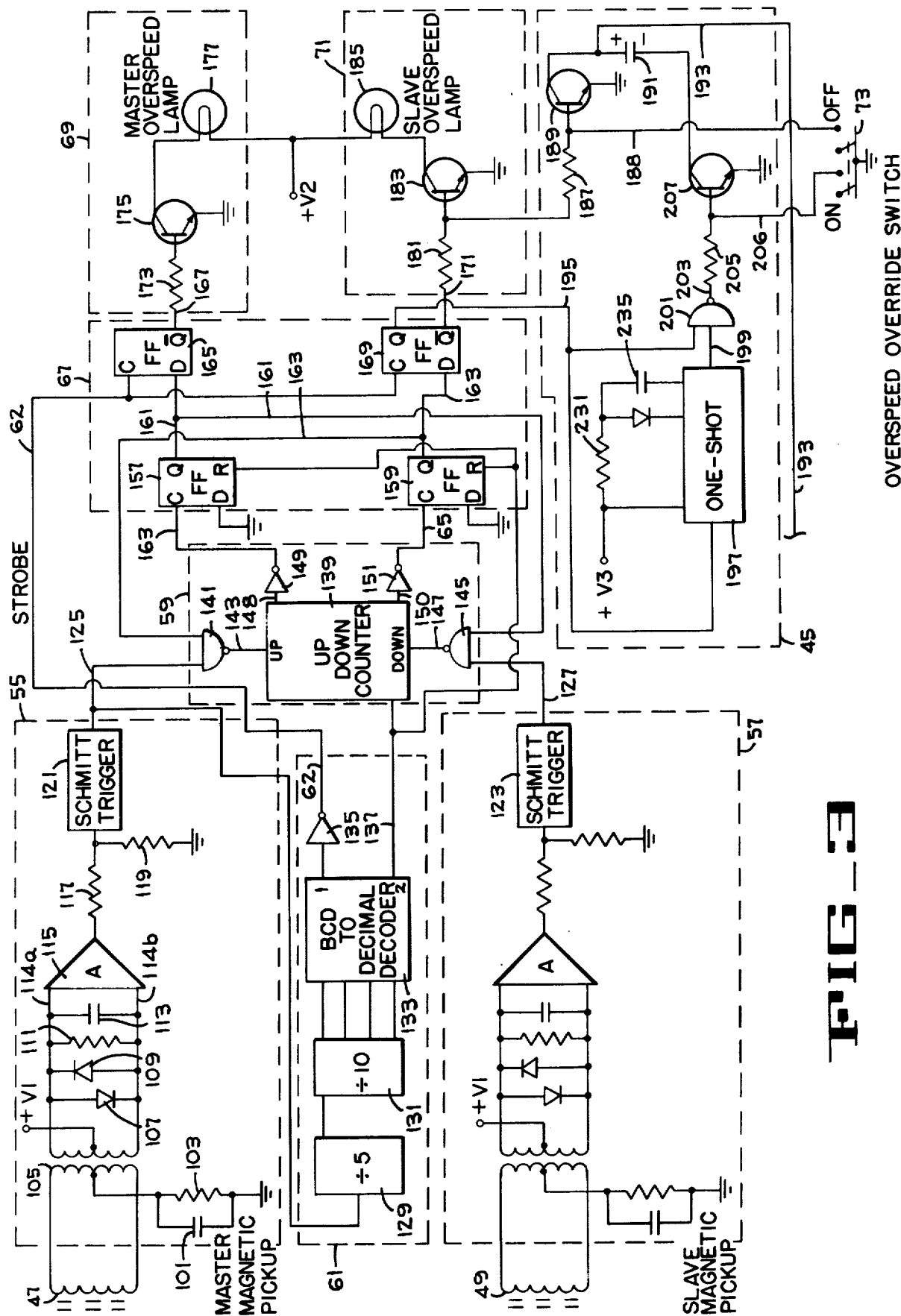

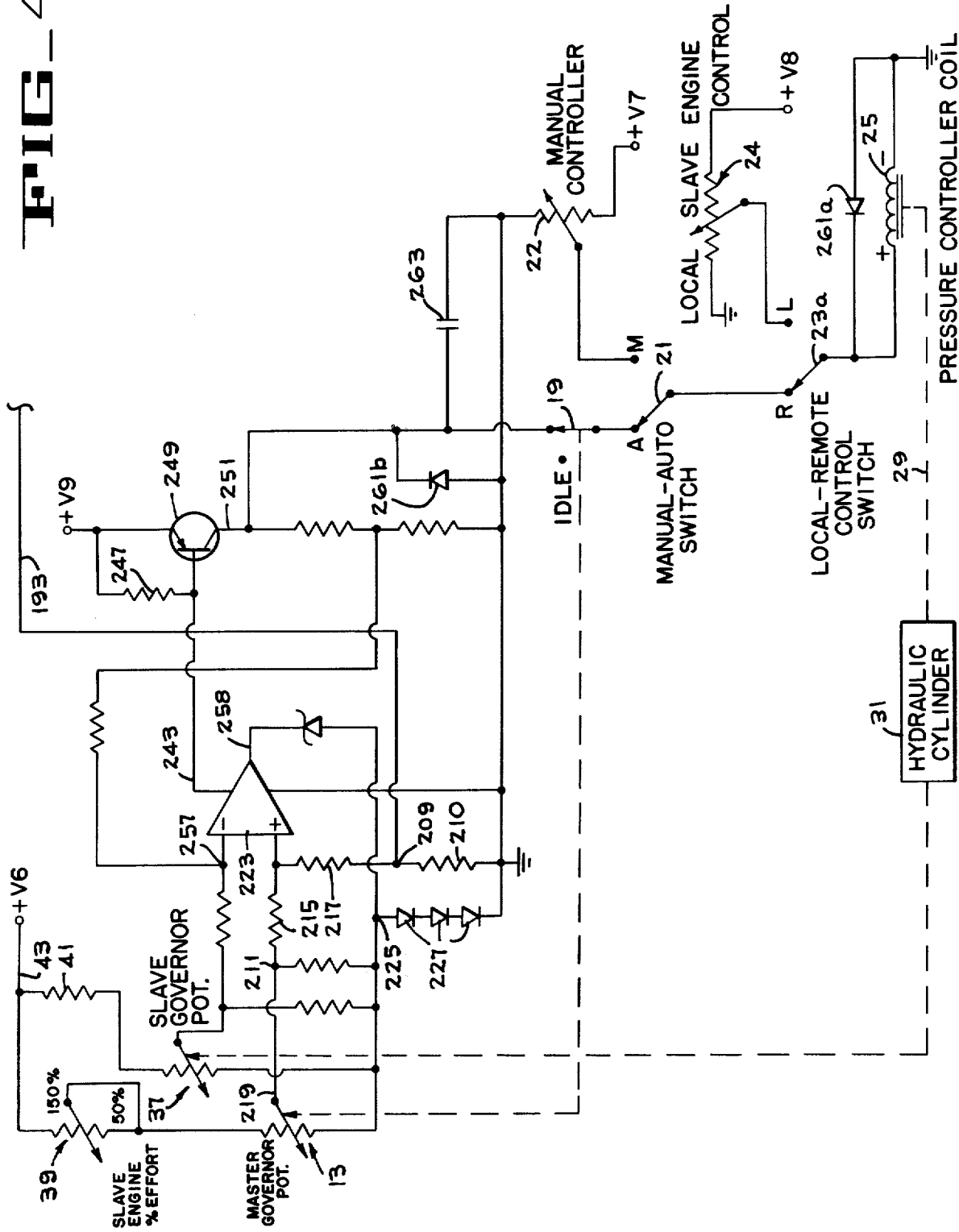

MULTI-ENGINE, ARTICULATED VEHICLE APPARATUS

BACKGROUND OF THE INVENTION

1. Field of the Invention

This invention pertains to control devices for prime movers, and more particularly, to electronic governors for speed control to one of two or more connected, independently powered vehicles.

2. Description of the Prior Art

Where powered vehicles are used to move great loads, or where such vehicles operate over rough or uneven terrain, two or more such vehicles, each with its own engine and transmission, are often linked together to form one unit for purposes of transport of the load. A first problem encountered in such an arrangement is control: the driver of the linked vehicles, seated on one of the powered vehicles (hereinafter designated the master vehicle), must be able to control ground speed of the overall unit, for example, through control of the engine speed of the other powered vehicles (hereinafter designated as slave vehicles) which are linked together with the master vehicle. It is preferable that this control be automatic insofar as possible, with possible manual overrides, so that the driver may direct his attention to manual control of the master vehicle.

Earlier inventions for the control of one or more motorized slave vehicles from a motorized master vehicle include the disclosure in U.S. Pat. No. 2,140,109 to Kellar, wherein the master vehicle is directly controlled by the operator throttle pedal and a mechanical link therefrom controls the throttle setting of the slave vehicle engine. The more recent U.S. Pat. No. 3,804,191 to Golan teaches the simultaneous electrical control of master and slave engines and simultaneous gear change of the two vehicles; anti-stall control apparatus causes the slave transmission to downshift if the slave wheel speed drops below a certain value and is used primarily to control slip of the vehicle wheels.

The use of magnetic pickups or like devices to determine wheel speed or overspeed and the utilization of such devices in control circuits for controlling the wheel speed is common in the prior art. The earlier U.S. Pat. Nos. 3,060,602 to Buttenhoff, 3,257,612 to Gorrill et al. and 3,776,355 to Scherenberg teach the use of such monitoring devices and control circuits. The patent to Scherenberg, for example, teaches the use of means for monitoring wheel speeds on a vehicle wherein excess wheel slippage provides a signal which acts to reduce the engine output.

An earlier wheel slip control invention is disclosed in the U.S. Pat. No. 3,130,805 to Carter, which also makes use of magnetic pickup devices for monitoring the wheel speeds of tractor and trailer vehicles with only the tractor vehicle being powered, and control of the tractor throttle is through electro-magnetic means controlled by said pickup devices.

The U.S. Pat. No. 3,776,322 to Misch teaches the use of electronic apparatus for slip control of driven versus undriven axles on a single vehicle.

The prior-mentioned patents teach the use of circuitry which is primarily, or entirely, analog. An exception to the parade of analog wheel speed control inventions is disclosed in the U.S. Pat. No. 3,802,188 to Barrett and comprises a digital electronic governor. Barrett uses an up-down counter to monitor and compare actual wheel speed with a desired wheel speed, each speed being represented by a pulse train of variable frequency. The Barrett approach is quite complex as it uses iteratively weighted averages of the prior and present pulse period difference to generate commands to the governor.

SUMMARY OF THE INVENTION

The present invention comprises circuitry which separately monitors a wheel or drive shaft for each vehicle of an articulated master-slave vehicular apparatus, comparing the wheel speed of the slave vehicle to the wheel speed of the master vehicle and developing a signed wheel speed difference signal. The throttle setting of each vehicle (master and slave) is also sensed, and a servo loop is provided wherein a voltage representing each setting is coupled to a signal comparison means. When the wheel speed of the slave vehicle is greater than the wheel speed of the master vehicle the wheel speed difference signal is selectively coupled to the signal comparison means. The signal comparison means produces a signed throttle control signal having a value determined by the values of the throttle settings and by any predetermined overspeed of the slave vehicle wheel. The throttle control signal is input to actuator means connected to the throttle of the slave vehicle, which actuator means alters the setting on said throttle to restore equality between the throttle settings of the master and slave vehicles.

It is a primary object of the present invention to provide an electronic governor for two or more linked vehicles, each with its own engine and transmission, so that the wheel speed of each vehicle is automatically related to and controlled by the throttle setting of one of the vehicles.

BRIEF DESCRIPTION OF THE DRAWINGS

FIG. 1 is a functional block diagram of the master and slave engine control system of the present invention wherein mechanical control of the engine of the slave vehicle is effected through a pressure controller and hydraulic cylinder that is connected to the throttle control of the slave vehicle.

FIG. 2 is a functional block diagram of a modified embodiment of the servo loop for controlling the slave engine wherein engine control is effected electrically through a motor and associated gearing connected to the throttle control of the slave vehicle.

FIG. 3 is a schematic diagram of the electrical components of the overspeed detection and control initiation circuits utilized in the embodiment of FIG. 1.

FIG. 4 is a schematic diagram of the electrical and mechanical components which comprise the servo loop of the embodiment of FIG. 1.

DESCRIPTION OF THE PREFERRED EMBODIMENTS

As used herein, the term signal will designate any electrical manifestation having information content, such as voltage or current. The automatic throttle control system described herein is basically an electro-hydraulic position-following servo. The embodiments described herein are directed to a control system for a pair of interconnected, separately powered vehicles including one master vehicle and one slave vehicle. However, it will be clear that the control system of the present invention is applicable as well to a plurality of independently powered slave vehicles linked to a master vehicle. The master and slave vehicle engines have separate throttle control devices which are herein designated as governor control arms.

Referring to the block diagram of FIG. 1, as the accelerator pedal of the master vehicle is depressed, the governor arm 11 is moved off its idle position and a potentiometer shaft 12, which is mechanically linked to the governor arm, is rotated; thus, the output voltage of a potentiometer 13 increases. This signal is used in a servo loop to control the movement of the governor arm 33 of the slave vehicle. The signal from potentiometer 13 is fed into a summing junction 15 the output of which is directed to an operational amplifer 17. The amplifier output is passed through three override switches, all normally operated in the closed position as shown. These override switches include (1) a master throttle switch 19 which when the master governor arm is moved to the idle position, opens the servo loop to increase the response of the slave governor arm 33; (2) a manual-automatic switch 21 which, in its open position, allows the slave governor arm to be controlled directly from the master vehicle by means of a potentiometer 22; and (3) a local-remote control switch 23 which, in its open position, allows the slave engine to be operated locally, i.e., from the slave vehicle itself, by means of a potentiometer 24. The output from the amplifier 17 passes through these three override switches and controls the current into a coil 25 of an electro-hydraulic pressure controller 27. The pressure controller 27 receives its fluid from the automatic transmission (not shown) of the slave vehicle (100 psi minimum) and provides an output pressure in the output line 29 proportional to the applied coil voltage. This control pressure drives the piston of a hydraulic cylinder 31 which actuates the slave governor control arm 33 as with the master governor arm, the slave governor arm is mechanically connected to the shaft of a potentiometer 37, and the voltage on the potentiometer 37 is applied to the summing junction 15 (in opposition to the voltage from potentiometer 13) to complete the servo loop. The slave governor potentiometer shaft 34 is thus moved until the voltage from the slave potentiometer 37 balances the master governor potentiometer output voltage.

The slave grovernor potentiometer 37 is in series with a fixed resistance 41, and this line is tied to a voltage source V6. Another voltage control device, marked "slave engine % effort," is provided by a rheostat 39 connected between the master governor potentiometer 13 and the voltage source V6. By adjusting slider arm of the rheostat 39, the balance point of the master governor potentiometer 13 can be varied so that the voltage across the master potentiometer can be varied between 50% and 150% of the voltage across the slave governor potentiometer 37. This permits the slave servo loop to be adjusted to compensate for load difference between the master and slave vehicles which effect their relative wheel speeds.

The switch 19, connected between the amplifier 17 and the pressure controller coil 25, operates as a safety device. In case of failure of the amplifier or of the summing junction circuitry 15, the operator (once he senses the incorrect vehicle operative conditions) need only take his foot off the master accelerator pedal and the switch 19 will interrupt the circuit to the pressure controller, thereby allowing the sharply reduced voltage on the coil 25 to rapidly move the slave governor arm 33 to its idle position. The switch 19 is open in the idle mode of the engines and closes as soon as the master engine governor arm is moved in a speed-increasing direction.

The manual-automatic switch 21, which is located on the control panel of the master vehicle, disables the servo circuit and permits manual control of the slave engine from the master vehicle. This switch would be used in case of trouble in the servo circuit and also for warming up the slave engine independently of the master engine. The control switch 21 directly applies a signal from voltage source V7 through a potentiometer 22 to the regulator coil 25 without feedback control.

The third override switch, arranged to be activated from the slave vehicle, is the toggle switch 23. This switch has two positions, "local control" and "remote control". In the "local control" position, the slave engine can be controlled locally by applying voltage from source V8 through a potentiometer 24 directly to the pressure controller coil 25. Normally, the toggle switch 23 will be in the "remote control" position, allowing manual or automatic control of the slave engine from the master vehicle.

The summing junction circuitry 15 has a third input which is arranged to receive a signal that counters, or effectively overrides, the master throttle signal if a "slave overspeed" condition occurs as discussed hereinafter. This signal comprises a ramp voltage produced by a time delay and ramp generator circuit 45 the details of which will be more fully described hereinafter.

Both the master and the slave vehicles have magnetic pickups 47 and 49, respectively, installed adjacent to notched discs 51 and 53, respectively, mounted on the respective drive shafts of the vehicles or on the respective vehicle wheels. Each disc 51, 53 has 24 notches spaced evenly around its circumference. Each magnetic pickup produces a pulse for each notch which passes by. The respective pulses are applied, through separate input conditioning circuits 55 and 57 to a breakaway detector circuit 59. During each cycle of 50 pulses from the master vehicle pickup 47, this circuit 59 operates to digitally add each master pulse and subtract each slave pulse received to obtain the signed difference, in digital form, which represents the difference in the angular velocities of the master and slave wheels. The aforesaid 50-pulse cycle is generated by also feeding the master vehicle pulses from the output conditioning circuit 55 to a period generator circuit 61 that is connected to control the operation of the breakaway detector circuit 59. At the beginning of each new 50-pulse cycle, the period generator circuit 61 resets the breakaway detector circuit 59 and also produces a strobe pulse on output line 62 to transfer and reset information within an output latch circuit 67. If the signed difference output of the breakaway detector circuit 59 is above a predetermined, positive threshold value, an output line 63 of the breakaway detector circuit provides a signal to the output latch circuit 67 which, in turn, causes a "master overspeed"light 69 to be activated in the master vehicle for visual observation by the operator thereby permitting him to take corrective action by reducing the speed of the master vehicle. If the signed difference output of the breakaway detector circuit 59 is below a predetermined, negative threshold value, an output line 65 provides a signal to the output latch circuit 67 which has two consequences. First, a slave overspeed light 71 is activated in the master vehicle for visual observation by the operator. Second, the time delay and ramp generator circuit 45 is activated to rapidly reduce the throttle setting of the slave vehicle and thereby the speed of the slave engine. This is effected by feeding the output of the generator circuit 45 to the summing junction circuitry 15 in order to effectively override the signal received from the master governor potentiometer; the result of this override is that the summing junction circuitry 15 senses a substantially and abruptly reduced speed signal (seen as approximately two-thirds of its previous value). This is followed by a corresponding real reduction in slave vehicle wheel speed through corrective action taken by the slave throttle governor arm 33. After the slave overspeed condition has been corrected, the input to the summing junction circuitry 15 from the time delay and ramp generator circuit 45 causes the slave vehicle throttle setting signal) in the servo loop to slowly increase again to the point where the error signal (from circuit 45) drops out the servo loop is again controlled directly from the opposed signals from potentiometers 13 and 37. If the overspeed condition persists, the slave throttle setting will remain at a position lower than the master throttle setting until proper load conditions or traction conditions with respect to the two vehicles are restored.

A fourth override function is provided by an overspeed override switch 73 which enables the operator to disable the time delay and ramp generator circuit 45 and thus permit no automatic correctional action. This would be useful, for example, where overspeed, or slip, of the slave wheels is preferred or is to be ignored, such as might occur in transport of loads over rough or uneven terrain.

A second embodiment of the servo loop portion of the control circuitry of the present invention is illustrated in FIG. 2. In this embodiment the pressure controller 27 and its operating coil 25 and the associated hydraulic cylinder 31 are replaced by a torque motor 28 and mechanically connected gear means 32, said gear means being connected to drive the slave governor control arm 33 through appropriate linkage including a magnetic clutch. All other details of the servo loop are as described with respect to FIG. 1.

Referring to FIG. 3, a number of rectangular blocks, each containing many electrical components, have been delineated by broken lines to indicate the corresponding functional blocks appearing in FIG. 1. Thus, for example, the components within the block indicated by the numeral 55, represent the input conditioning circuit 55 for the pulses coming from the wheel of the master vehicle; the block 57 denotes the input conditioning circuit 57 for the pulses coming from the wheel of the slave vehicle; the block 59 denotes the breakaway detector circuit; the block 61 denotes the period generator circuit; the block 67 denotes the output latch circuit; the block 69 denotes the master vehicle overspeed light and its drive means; and the block 71 indicates the slave vehicle overspeed light and its drive means.

Considering first the electrical components which comprise the input conditioning circuit 55, it will be seen that a capacitor 101 and a resistor 103 are connected in parallel to the center tap on the primary winding of a transformer 105 that is connected to receive the signal input from magnetic pickup 47, said capacitor-resistor network acting as a current bleed for DC and high frequency AC currents. The secondary winding of the transformer 105 is shifted with respect to ground by applying a positive reference voltage V1 to the center tap thereof. A first diode 107 and a second oppositely oriented diode 109 clip the signal from transformer 105 and feed it through impedance matching resistor 111 and filtering capacitor 113 to the input leads 114a and 114b and of operational amplifier 115. The output of the operational amplifier 115 passes through a voltage divider network includes a resistor 117 and a resistor 119 and is directed to a Schmitt trigger circuit 121 which provides a train of output pulses corresponding to the pulse received from pickup 47 but having sharply defined leading edges. The components within the input conditioning circuit 57 for the pulses received from the pickup 49 on the wheel of the slave vehicle are identical to those of the aforedescribed circuit 55 and include a Schmitt trigger circuit 123 identical to the trigger circuit 121.

The output lines 125 an 127 of the respective Schmitt trigger circuits 121 and 123 carry squared and shaped pulses which are used to drive logic circuitry including flipflops and various counting devices. The pulses carried by output line 125 are directed to a modified decade counter 129 which forms the first component of the period generator circuit 61. This counter 129 is a modulo 5 counter, and the output thereof feeds a decade counter 131. The two counters 129 and 131, taken together, form a modulo 50 counter (i.e., a divide-by-50 circuit) for purposes of period generation. The four output leads of the counter 131 carry binary signals to a BCD-to-decimal decoder 133. The output signals from the decoder 133 are provided during two consecutive five pulse intervals of the 50-pulse cycle; thus, output lead 1 is activated for pulses 1 through 5, and output lead 2 is then activated for pulses 6 through 10.

The output signal carried by output lead 1 of the decoder 133 is inverted by a gate 135. The signal carried by output line 62 of the gate 135 is used to strobe certain flipflops as discussed more fully hereinafter.

The signal carried by output line 137 of the decoder 133 is input to a 4-bit up-down counter 139 which forms the central component of the breakaway detector circuit 59. The signal carried by output line 137 resets the up-down counter 139. The up count command to the counter 139 is the signal carried by out-put line 143 of a two-input NAND gate 141. One of theinputs of this NAND gate is the signal carried by output line 125 of the Schmitt trigger circuit 121 which provides the pulses from the wheel of the master vehicle. The second input of the NAND gate 141 is the signal appearing on the Q output line 163 of an information storage flipflop 159.

Similarly, the down count command to the counter 139 is the signal carried by output line 147 of a two-input NAND gate 145, one of whose two inputs is the signal carried by output line 127 of the Schmitt trigger circuit 123 which provides the pulses from the wheel of the slave vehicle. The second input to this NAND gate 145 is the signal appearing on the Q output line 161 of another information storage flipflop 157. The flipflops 157 and 159 form part of the output latch circuit 67.

The purpose of the second signal carried by input line 163 to the NAND gate 141 is to disable the gate, and thus the up count command to the counter 139 as discussed infra, whenever said counter overflows negatively (generates a BORROW command) within a 50-pulse cycle. Similarly, the second signal carried by input line 161 to the NAND gate 145 disables said gate, and thus the down count command to the counter 139 as discussed infra, whenever said counter overflows positively (generates a CARRY command) within a 50-pulse cycle.

At the beginning of each 50-pulse cycle, the up-down counter 139 is set to an initial value of 8 by the pulse from line 137. During a given counting cycle, each pulse from the master magnetic pickup device 47 arriving on the input line 143 to the counter 139 adds one count to whatever is in said counter. During this same phase, each pulse which arrives from the slave vehicle magnetic pickup device 49 on the input line 147 to the counter 139 subtracts one count from whatever is in said counter. Thus, simultaneous addition and substraction occurs, beginning with an initial value of 8. If the counter reaches the number 16 or higher during a given counting cycle a CARRY command on output line 148 is generated by the counter 139 which is inverted by a gate 149. If the count in the counter 139 reaches the value −0 or below during the same counting cycle, a BORROW command on output line 150 is generated by the counter 139 and is inverted by a gate 151. The numbers 16 and −0 are attained in the counter 139 if and only if the wheel speed of one vehicle exceeds the wheel speed of the other vehicle by at least 17.8% over the given counting cycle.

The signals carried by the output lines 148 and 150 of the counter 139 are high initially. The signal on the output line 148 goes low if and only if a CARRY command (i.e., wheel of the master vehicle running faster than the wheel of the slave vehicle) is generated within the 50-pulse cycle; similarly, the signal on the output line 150 goes low if and only if a BORROW command (i.e., wheel of the slave vehicle running faster than the wheel of the master vehicle) is generated within the cycle. Thus, the signals carried by output lines 63 and 65 of the respective gates 149 and 151 are low initially; one or the other of these signals may go high, thus generating a positive edge trigger to either flipflop 157 or 159, if a CARRY or BORROW command, respectively, occurs.

The signal carried by output line 63 of the gate 149 is low (=0if and only if no CARRY command has been generated by the counter 139; if such CARRY command is generated, the corresponding signal on output line 63 goes high (=1). Similarly, the signal on output line 65 of the gate 51 is low if and only if no BORROW command is generated by the counter 139 during the 50 pulse cycle; if such BORROW command is generated, the corresponding signal on output line 65 goes high. The flipflops 157 and 159 are each preferably a Dual D-type flipflop which trigger on the positive edge of the clock or enabling input from lines 63 or 65 and transfer the state of the D input to the Q output. Thus, for example, the grounded D input signal of flipflop 157 would be transferred to the Q output line 161 of said flipflop only upon arrival of a positive trigger pulse; which trigger pulse, in turn, occurs if and only if a CARRY command signal on output line 148 is generated by the counter 139. The flipflops 157 and 159 are reset by the reset pulse from line 137 as shown. The signal carried by the Q output line 161 of the flipflop 157 is fed to the D input of a flipflop 165, which flipflop has as its clock input the strobe signal carried by output line 62 from the gate 135. Similarly, the signal carried by the Q output line 163 from the flipflop 159 is fed to the D input of a flipflop 169, which flipflop also has as its clock input the strobe signal carried by the output line 62 of the gate 135. Flipflops 165 and 169 are also preferably Dual D-type flipflops. The signal appearing on the $\overline{Q}$ output line 167 of the flipflop 165 indicating a master wheel overspeed condition, passes through a resistor 173 to the base of a transistor 175 to turn the transistor on which, in turn, lights a master vehicle overspeed indicator lamp 177 connected to supply voltage V2. The signal carried by output line 167 is high if and only if, during the previous 50-pulse cycle, the counter 139 generated a CARRY command.

Similarly, the signal appearing on the $\overline{Q}$ output line 171 of the flipflop 169 passes through a resistor 181 to the base of a transistor 183 to turn the transistor on which, in turn, lights a slave overspeed indicator lamp 185. The signal carried on output line 171 is high if and only if, during the previous 50-pulse cycle, the counter 139 generated a BORROW command indicating a slave wheel overspeed condition.

The signal appearing on the Q output line 171 of the flipflop 169 serves to initiate a signal in the time delay and ramp generator circuit 45. The signal on line 171 is fed through a resistor 187 to the base of a transistor 189 whose collector voltage is connected to the positive terminal of a capacitor 191 which is normally charged during the operation of the control circuitry of the present invention. If the signal on the Q output line 171 goes high (as it does following the detection of a slave wheel overspeed condition), the transistor 189 turns on, thus draining the charge from said positive terminal of the capacitor 191. This results in a zero voltage signal on line 193, with consequences as discussed hereinafter. If the signal on the $\overline{Q}$ output line 171 goes high, the signal appearing on Q output line 195 of this same flipflop 169 goes low; this low signal on output line 195 is input to a retriggerable monostable multivibrator or one-shot, 197. The signal appearing on output line 199 of the one-shot 197, together with the signal on Q output line 195 of the flipflop 169, are fed as inputs to a NAND gate 201. The signal carried on output line 199 of the one-shot 197 is always high except when the one-shot is on for a period of time after receiving the positive edge of a pulse; during this "timing out" interval, and only then, the signal carried on output line 199 is low. With the appropriate choice of the parameters for the resistor 231 and the capacitor 235, the interval for "timing out" is normally set at 5–8 seconds.

Initially, before a BORROW command has been generated, the signal carried on the Q output line 195 of the flipflop 169 is high and the output 199 of the one-shot 197 is also high. The signal on the output line 203 of the NAND gate 201 is thus low, so that the transistor 207 is normally cut off. After a BORROW command has been generated, indicating slave vehicle wheel overspeed, and its effect has passed through the system to the flipflop 169, the signal on output line 195 goes low while the signal on output line 199 of the multivibrator 197 stays high. The signal on output line 203 of the NAND gate 201 now goes high and is fed through a resistor 205 to the transistor 207 so as to turn the transistor on. Also, the signal goes high on line 171 to turn transistor 189 on which grounds the positive side of the capacitor 191 to drain the charge on the capacitor. This action provides the signal to the summing junction 15 (FIG. 1) which effects the altered operation of the servo loop wherein the slave governor arm is moved to rapidly reduce the slave wheel speed.

It should be noted that the collector terminal of the transistor 189 (FIG. 3) is connected by means of line 193 to the node point 209 (FIG. 4) in the servo loop which communicates with ground through a resistor 210. The function of the summing junction 15 is provided by an operational amplifier 223 which has differential input lines from the slave governor potentiometer 37 and the master governor potentiometer. When the signal on output line 193 of the transistor 189 goes low (voltage equals zero), the voltage at node point 209 is also reduced to zero. The relative values of the resistors 210, 215 and 217 are chosen such that the result of reducing the voltage at node point 209 abruptly to zero is to abruptly reduce the voltage at the node point 213 to approximately two-thirds of its initial value. The effect of this is that the full throttle signal carried on line 219 arising from the supply voltage V6 through the master potentiometer 13 does not reach the operational amplifier 223; instead, a sharply reduced voltage signal reaches the positive input of the amplifier 223 since the voltage dropping resistor 210 is abruptly dropped out of the circuit. The signal from the slave potentiometer, however, reaches the amplifier 223 unchanged. The servo loop, of which the amplifier 223 is a part, reacts by providing a control signal to reduce the slave throttle in order to reduce the wheel speed of the slave vehicle. In order to operate properly, the operational amplifier 223 requires that the voltage at the node point 225 be at least 2 volts. To insure this, three diodes 227, each with a bias of approximately 0.7 volt, are arranged serially to insure the required minimum voltage at the node point 225.

When the slave wheel overspeed condition clears, the output conditions of the flipflop 169 (FIG. 3) are reversed so that the signal on its Q output line 195 goes high, thus triggering the one-shot 197. The signal on the output line 199 of the one-shot then goes low and stays low until the one-shot circuitry has "timed out" which is normally set for 5–8 seconds. The signals carried on input lines 195 and 199 to the NAND gate 201 are now high and low, respectively, so that the signal on output line 203 remains high and the transistor 207 remains turned on, thus permitting the capacitor 191 to be recharged. The signal appearing at the $\overline{Q}$ output line 171 of the flipflop 169 is now low, so that the transistor 189 is turned off thereby allowing the positive terminal of the capacitor 191 to recharge to the potential determined by the voltage from the master governor potentiometer 13. The purpose of the one-shot 197 is to keep the transistor 207 turned on long enough to allow the capacitor 191 to fully charge after the slave wheel overspeed condition is cleared, the charging of the capacitor 191 being provided by the voltage of the master potentiometer 13. After the one-shot 197 has timed out in 5–8 seconds, the signal on the $\overline{Q}$ output line 199 goes high again, so that the signal on output line 203 of the NAND gate 201 goes low, thus cutting off the transistor 207. The capacitor 191 now "floats," losing its effect on the input of the operational amplifier 223 so as not to effect the normal servo loop operation.

If the slave wheel breakaway condition does not clear within the cycle, the slave overspeed lamp stays on and the slave throttle signal is maintained by holding the voltage at node point 209 at zero until this condition clears.

The power input lead of the operation amplifier 223 (FIG. 4) is connected through line 243 to a transistor 249 which is connected to a voltage source V9. A shunt resistor 247 allows the transistor 249 to be maintained in a non-conducting condition when the master vehicle potentiometer 13 is in the IDLE positin. As the master governor potentiometer 13 is moved in a speed increasing direction, an increasingly negative voltage is developed in the line 243 of the operational amplifier 223 which turns the transistor 249 on. The transistor 249 acts as an amplifier for the signal from amplifier 223 so that the voltage of the collector output line 251 will rise continuously from approximately 0 volts to a maximum of V9 volts through the operating range of voltages provided by the master governor potentiometer 13.

The diodes 262a and 261b limit the backflow of current from the pressure controller coil to the transistor 249 or the operational amplifier 223 when the control circuit is shut down suddenly to prevent damage thereto, and a capacitor 263 provides a filter for high frequency oscillations.

Either described embodiment of the present invention is also operable in a multi-slave engine mode. Referring particularly to FIG. 1, one merely utilizes the line 12 signal from the master governor potentiometer and the signal from the input conditioning circuit 55 duplicating the rest of the circuitry for each slave vehicle.

Although the best modes contemplated for carrying out the present invention have been herein shown and described, it will be apparent that modification and variation may be made without departing from what is regarded to be the subject matter of the invention.

What is claimed is:

1. In an articulated vehicular apparatus including a master vehicle, said master vehicle having an engine and associated throttle and drive shaft for drive shaft for driving a ground engaging wheel of the master vehicle, and a slave vehicle, said slave vehicle having an engine and associated throttle and drive shaft for driving a ground engaging wheel of the slave vehicle, an electronic governor controlling the entine of the slave vehicle comprising:

first signal generating means operatively associated with the ground engaging wheel of said master vehicle for producing a first signal indicative of the angular velocity of said wheel;

second signal generating means operatively associated with the ground engaging wheel of the slave vehicle for producing a second signal indicative of the angular velocity of said wheel;

wheel speed signal comparison means connected to said first and second signal generating means for producing a signed wheel speed difference of said second and said first signals;

master throttle signal generating means connected to the throttle of the master vehicle for producing a master throttle signal indicative of the throttle setting of the master vehicle;

slave throttle signal generating means connected to the throttle of the slave vehicle for producing a slave throttle signal indicative of the throttle setting of the slave vehicle;

control signal comparison means connected to said master throttle signal generating means and to said slave throttle signal generating means means for selectively coupling said wheel speed difference signal to said control signal comparison means when the value of said second signal exceeds the value of said first signal, said signal comparison means producing a signed throttle control signal having a value determined by the values of said master throttle signal, said slave throttle signal and any wheel speed difference signal received; and actuator means responsive to said throttle control signal, said actuator means being connected to the throttle of the slave vehicle for adjusting the throttle of the slave vehicle to restore equality between said master throttle and said slave throttle signals.

2. An electronic governor according to claim 1 including means for rendering said actuator means responsive to said wheel speed difference signal only if said second wheel speed signal is greater than said first wheel speed signal by a predetermined amount 3. An electronic governor according to claim 2 further including threshold signal generating means operatively associated with said wheel speed signal comparison means for generating a threshold signal whenever said second wheel spaced signal exceeds said first wheel speed signal by said predetermined amount, said threshold signal generating means comprising a portion of said wheel speed signal comparison means and said control signal comparison means further including correction means for abruptly reducing said throttle control signal upon reception of said threshold signal from said threshold signal generating means.

4. An electronic governor according to claim 1 wherein said first and second signal generating means comprise magnetic pickup devices mounted adjacent the respective ground engaging wheels of the master and slave vehicles, said first and second signals comprising digital pulse trains produced by the respective magnetic pickup devices.

5. An electronic governor according to claim 4 wherein said wheel speed signal comparison means comprises an up-down counter, said first and second signal generating means being connected to said counter so that one of said signals produces an up-count command to the counter and the other of said signals produces a down-count command to the counter, the up-down counter being simultaneously operable to receiver both up-count and down-count commands.

6. An electronic governor according to claim 5 including means responsive to a predetermined number of pulses from one of said first and second signal generating means for resetting said up-down counter.

7. An electronic governor according to claim 1 wherein said actuator means includes electrically operated pressure controller means, hydraulic pressure means connected to the output of said pressure controller means, and mechanical linkage means connected to the governor arm of said throttle of the slave vehicle and to the hydraulic pressure means so that said setting on said throttle of the slave vehicle is changed in response to said throttle control signal received by said pressure controller means.

8. An electronic governor according to claim 1 including compensation means connected to said master throttle signal generating means to adjust said master throttle signal so that said master throttle signal can be adjusted upwardly or downwardly relative to said slave throttle signal to accommodate differences in loading of the master and slave vehicles.

9. An electronic governor according to claim 1 including throttle override means connected to said throttle of the master vehicle and to said actuator means to disconnect said actuator means from said wheel speed signal comparison means and said throttle signal comparison means, said override means being operative when said setting of said throttle of the master vehicle is reduced to its lowest value.

* * * * *

UNITED STATES PATENT AND TRADEMARK OFFICE
CERTIFICATE OF CORRECTION

PATENT NO. : 4,004,648
DATED : January 25, 1977
INVENTOR(S) : CRAIG L. JOSEPH, ET AL It is certified that error appears in the above-identified patent and that said Letters Patent are hereby corrected as shown below:

Col. 1, line 44, after "speed" delete "in" insert --is--.

Col. 2, line 8 , after "comprises" insert --control--.

Col. 4, line 52, after the "." delete --If the--.

line 53, before "signed" indent and insert --If the-- to start new paragraph.

Col. 6, line 6 , after "network" insert --which--.

Col. 9, line 60, after "within" delete "the" insert --one--.

line 64, change "operation" to --operational--.

Col. 10, line 1, change "positin" to --position--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks